US012280002B2

(12) United States Patent
Naber et al.

(10) Patent No.: US 12,280,002 B2
(45) Date of Patent: Apr. 22, 2025

(54) PATIENT TRANSPORT APPARATUS WITH DEFINED TRANSPORT HEIGHT

(71) Applicant: Stryker Corporation, Kalamazoo, MI (US)

(72) Inventors: Brandon David Naber, Portage, MI (US); Martin Fecteau, Bothell, WA (US); Brianna R. Graves, Paw Paw, MI (US)

(73) Assignee: Stryker Corporation, Portage, MI (US)

( * ) Notice: Subject to any disclaimer, the term of this patent is extended or adjusted under 35 U.S.C. 154(b) by 0 days.

(21) Appl. No.: 18/659,058

(22) Filed: May 9, 2024

(65) Prior Publication Data

US 2024/0285455 A1 Aug. 29, 2024

Related U.S. Application Data

(63) Continuation of application No. 17/471,291, filed on Sep. 10, 2021, now Pat. No. 12,005,015, which is a (Continued)

(51) Int. Cl.

*A61G 7/10* (2006.01)
*A47C 31/12* (2006.01)

(Continued)

(52) U.S. Cl.

CPC .......... *A61G 7/1013* (2013.01); *A47C 31/123* (2013.01); *A61G 1/0243* (2013.01);

(Continued)

(58) Field of Classification Search

CPC .. A61G 1/0212; A61G 1/0262; A61G 1/0237; A61G 7/1013; A61G 1/0243;

(Continued)

(56) References Cited

U.S. PATENT DOCUMENTS

| | | | |
|---|---|---|---|
| 7,398,571 | B2 | 7/2008 | Souke et al. |
| 7,690,059 | B2 | 4/2010 | Lemire et al. |

(Continued)

FOREIGN PATENT DOCUMENTS

| | | | |
|---|---|---|---|
| AU | 783695 | B2 | 11/2005 |
| JP | 2018500959 | A | 1/2018 |
| WO | 2007075701 | A2 | 7/2007 |

OTHER PUBLICATIONS

Merriam-Webster, "Definition of Pause", www.merriam-webster.com/dictionary/pause, 2023, 1 page.

*Primary Examiner* — David R Hare
*Assistant Examiner* — Madison Emanski
(74) *Attorney, Agent, or Firm* — Howard & Howard Attorneys PLLC

(57) ABSTRACT

Patient transport apparatus with defined transport height comprises a support structure and a litter that are interconnected by a lift mechanism. The support structure comprises a base frame and a plurality of articulable support members or legs. The litter comprises a litter frame and a patient support surface with articulating back and leg sections. The lift mechanism may comprise one or more actuators configured to raise and lower the litter between a lowered position and one or more defined raised positions. The Patient transport apparatus may further comprise a controller coupled to one or more sensors and the lift mechanism. The controller may be configured to define a transport height for the litter based, at least in part, on a characteristic detected by the one or more sensors, and to manipulate the lift mechanism to adjust the litter to the defined transport height.

20 Claims, 7 Drawing Sheets

Related U.S. Application Data continuation of application No. 16/271,114, filed on Feb. 8, 2019, now Pat. No. 11,141,334.

(60) Provisional application No. 62/628,532, filed on Feb. 9, 2018.

(51) Int. Cl.

| | |
|---|---|
| ***A61G 1/02*** | (2006.01) |
| ***A61G 1/04*** | (2006.01) |
| ***A61G 1/052*** | (2006.01) |
| ***A61G 1/056*** | (2006.01) |
| *A61G 7/002* | (2006.01) |
| *A61G 7/16* | (2006.01) |

(52) U.S. Cl.

CPC ............. *A61G 1/0293* (2013.01); *A61G 1/04* (2013.01); *A61G 1/052* (2013.01); *A61G 1/0567* (2013.01); *A61G 7/1046* (2013.01); *A61G 1/0262* (2013.01); *A61G 7/002* (2013.01); *A61G 7/16* (2013.01); *A61G 2203/34* (2013.01); *A61G 2203/40* (2013.01); *A61G 2203/44* (2013.01)

(58) Field of Classification Search

CPC ........ A61G 1/0293; A61G 1/04; A61G 1/052; A61G 1/0567; A61G 7/1046; A61G 7/002; A61G 7/16; A61G 2203/34; A61G 2203/40; A61G 2203/44; A61G 2203/20; A61G 2203/16; A61G 2203/42; A61G 7/012; A61G 1/017; A61G 1/0256; A61G 1/0562; A61G 1/0268; A61G 1/0287; A61G 1/048; A61G 2200/16; A61G 2203/12; A61G 2203/32; A61G 2203/726; A61G 7/018; A61G 1/003; A61G 1/02; A61G 1/025; A61G 13/06; A61G 2203/46; A61G 3/0875; A61G 3/0891; A61G 7/0507; A61G 7/0513; A61G 7/1074; A61G 1/00; A61G 1/0206; A61G 1/0275; A61G 1/042; A61G 1/056; A61G 1/06; A61G 2203/30; A61G 2203/74; A61G 2210/30; A61G 3/0218; A61G 3/0236; A61G 3/0254; A61G 3/0272; A61G 3/029; A61G 3/0816; A61G 3/0833; A61G 3/0883; A61G 7/001; A61G 7/005; A61G 7/015; A61G 7/0509; A61G 7/0527; A61G 7/057; A61G 7/05769; A61G 7/05792; A47C 31/123

See application file for complete search history.

(56) References Cited

U.S. PATENT DOCUMENTS

| | | | | |
|---|---|---|---|---|
| 7,694,368 | B2 | 4/2010 | Lewis, Jr. | |
| 8,239,983 | B2 | 8/2012 | Chinn | |
| 8,439,416 | B2 | 5/2013 | Lambarth et al. | |
| 8,863,331 | B2 | 10/2014 | Valentino et al. | |
| 9,205,009 | B2 | 12/2015 | Koors et al. | |
| 10,603,234 | B2 | 3/2020 | Puvogel et al. | |
| 10,617,327 | B2 | 4/2020 | Kostic et al. | |
| 11,141,334 | B2 | 10/2021 | Naber et al. | |
| 2006/0075558 | A1 | 4/2006 | Lambarth et al. | |
| 2007/0169269 | A1 | 7/2007 | Wells | |
| 2009/0165207 | A1 * | 7/2009 | Reed | B60T 7/10<br>5/608 |
| 2010/0199430 | A1 | 8/2010 | Chinn | |
| 2014/0039351 | A1 | 2/2014 | Mix et al. | |
| 2016/0128880 | A1 | 5/2016 | Blickensderfer et al. | |
| 2016/0287454 | A1 | 10/2016 | Magill et al. | |
| 2017/0035628 | A1 | 2/2017 | Naber et al. | |
| 2017/0128296 | A1 | 5/2017 | Kostic et al. | |
| 2017/0143566 | A1 | 5/2017 | Elku et al. | |
| 2017/0202715 | A1 | 7/2017 | Carletti | |
| 2017/0367915 | A1 * | 12/2017 | Blickensderfer | A61G 1/0212 |
| 2018/0303685 | A1 | 10/2018 | Souke et al. | |
| 2018/0303689 | A1 | 10/2018 | Souke et al. | |
| 2019/0247254 | A1 | 8/2019 | Naber et al. | |
| 2021/0401647 | A1 | 12/2021 | Naber et al. | |

* cited by examiner

PATIENT TRANSPORT APPARATUS WITH DEFINED TRANSPORT HEIGHT

CROSS-REFERENCE TO RELATED APPLICATIONS

The subject patent application is a Continuation of U.S. patent application Ser. No. 17/471,291 filed on Sep. 10, 2021, which is a Continuation of U.S. patent application Ser. No. 16/271,114 filed on Feb. 8, 2019 and issued as U.S. Pat. No. 11,141,334 on Oct. 12, 2021, which claims priority to and all the benefits of U.S. Provisional Patent Application No. 62/628,532 filed on Feb. 9, 2018, the disclosures of each of which are hereby incorporated by reference in their entirety.

BACKGROUND

Patient transport apparatuses, such as hospital beds, stretchers, cots, tables, wheelchairs, and chairs facilitate care and transportation of patients. Conventional patient transport apparatuses comprise a base, lift mechanism, and a litter comprising a patient support surface upon which the patient is supported. The litter usually comprises several articulable sections, such as a back section and a leg section to facilitate the care of the patient. Furthermore, the litter may generally be raised and lowered relative to the transport surface to allow for care and transportation of the patient.

Traditionally, the height of the litter has been adjusted based on the needs of the operator of the patient transport apparatus, for example, raising and/or lowering the litter to a height that allows the operator to comfortably manipulate the patient transport apparatus to transport the patient to a desired location. Alternatively, the operator may adjust the height of the litter based on a procedure to be administered to the patient. However, when transporting a patient on a patient transport apparatus, there is always a risk that the patient transport apparatus may tip over. This likelihood of tipping may further be increased based on a ratio of the height of the litter relative to the physical characteristics of the patient or other object positioned on the patient transport apparatus. For example, as the mass of the object supported by the patient transport apparatus and height of the litter both increase, so does the center of gravity of the patient transport apparatus and odds that the patient transport apparatus may tip over.

Therefore, a patient transport apparatus capable of determining a desired litter height for transporting an object based on the characteristics of the object to be transported, and to adjust the litter height to the desired height, to overcome one or more of the aforementioned disadvantages is desired.

BRIEF DESCRIPTION OF THE DRAWINGS

Advantages of the present disclosure will be readily appreciated as the same becomes better understood by reference to the following detailed description when considered in connection with the accompanying drawings wherein.

DETAILED DESCRIPTION

Figure 1:
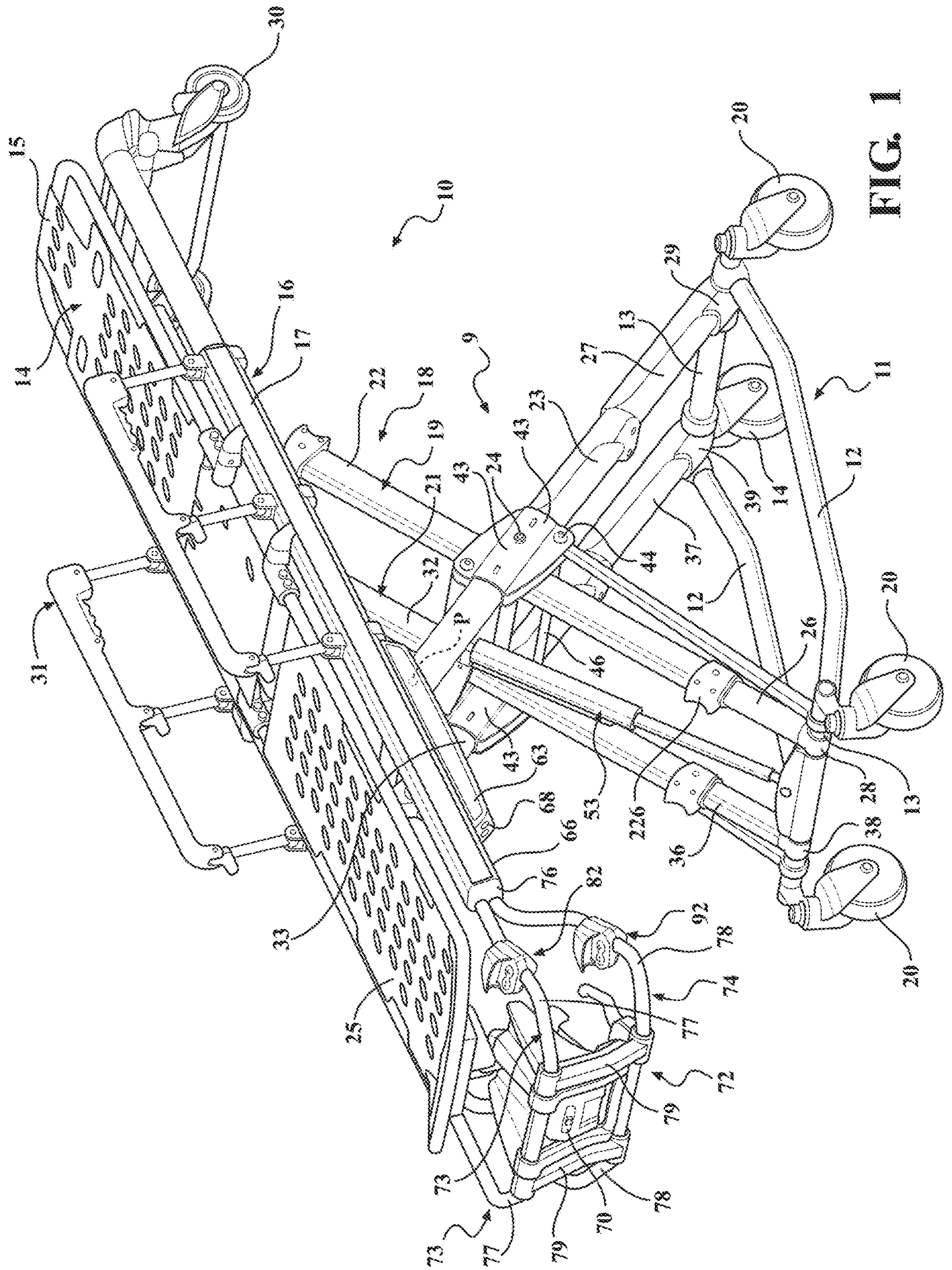
FIG. 1 is a perspective view of a patient transport apparatus.
Figure 2:
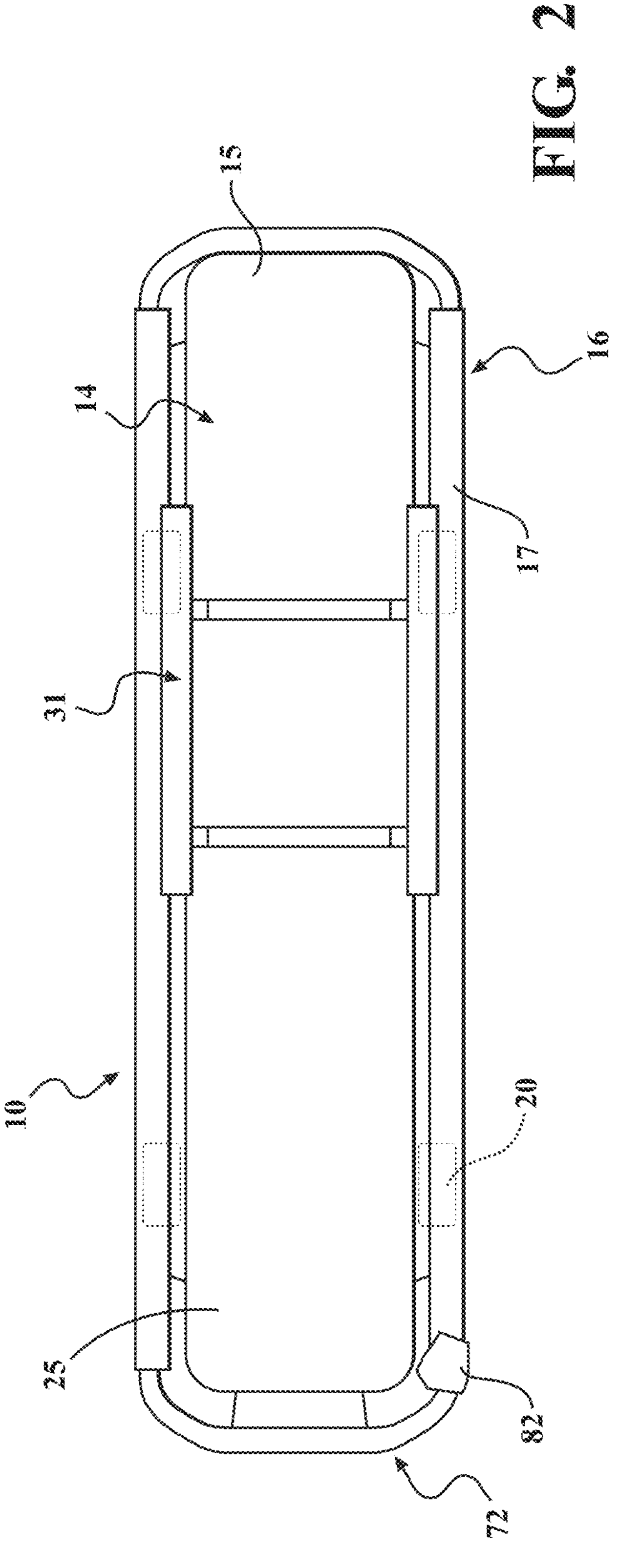
FIG. 2 is a top view of the patient transport apparatus of FIG. 1.
Figure 3A:
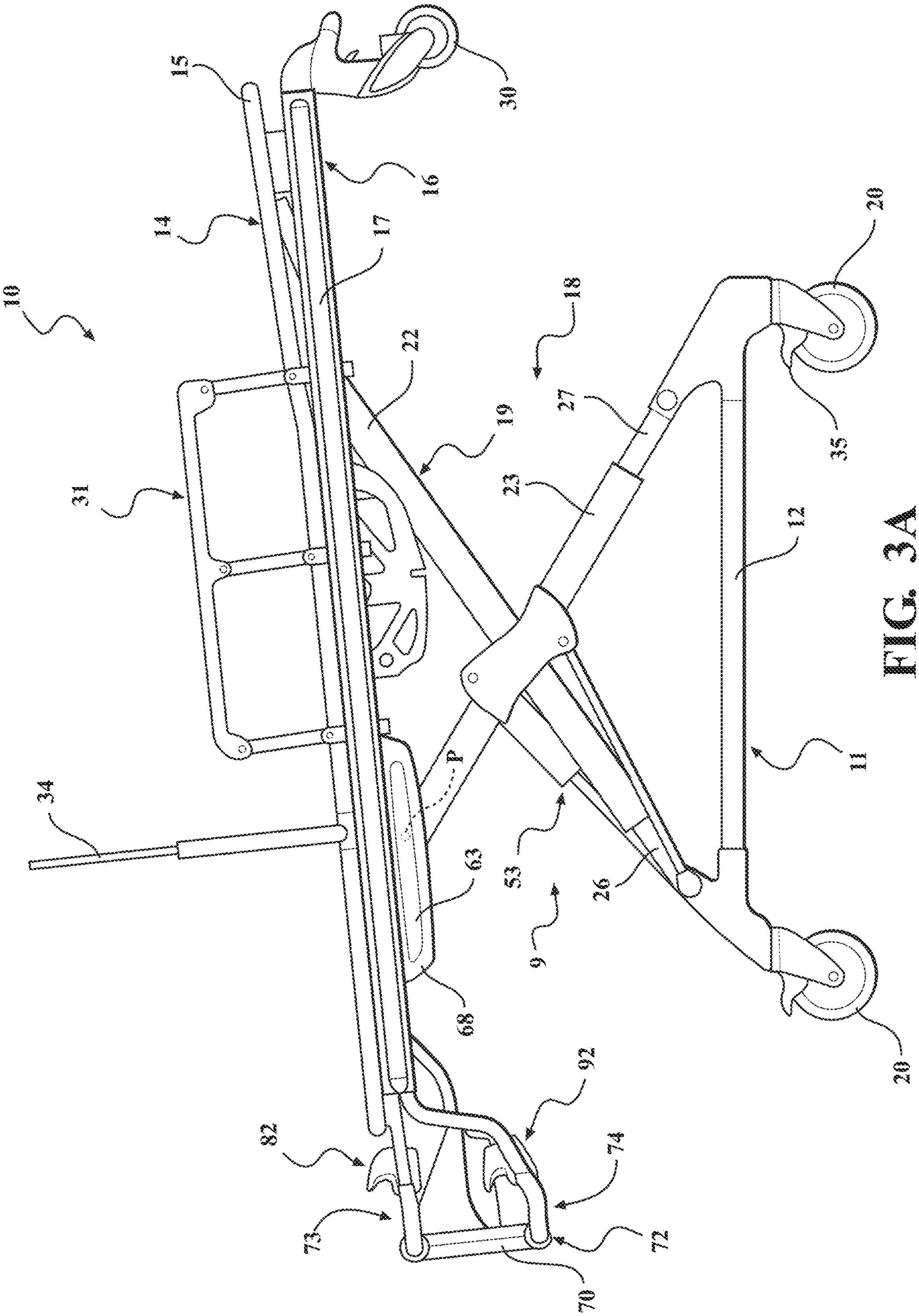
FIG. 3A is a side view of the patient transport apparatus of FIG. 1 in an elevated position.
Figure 3B:
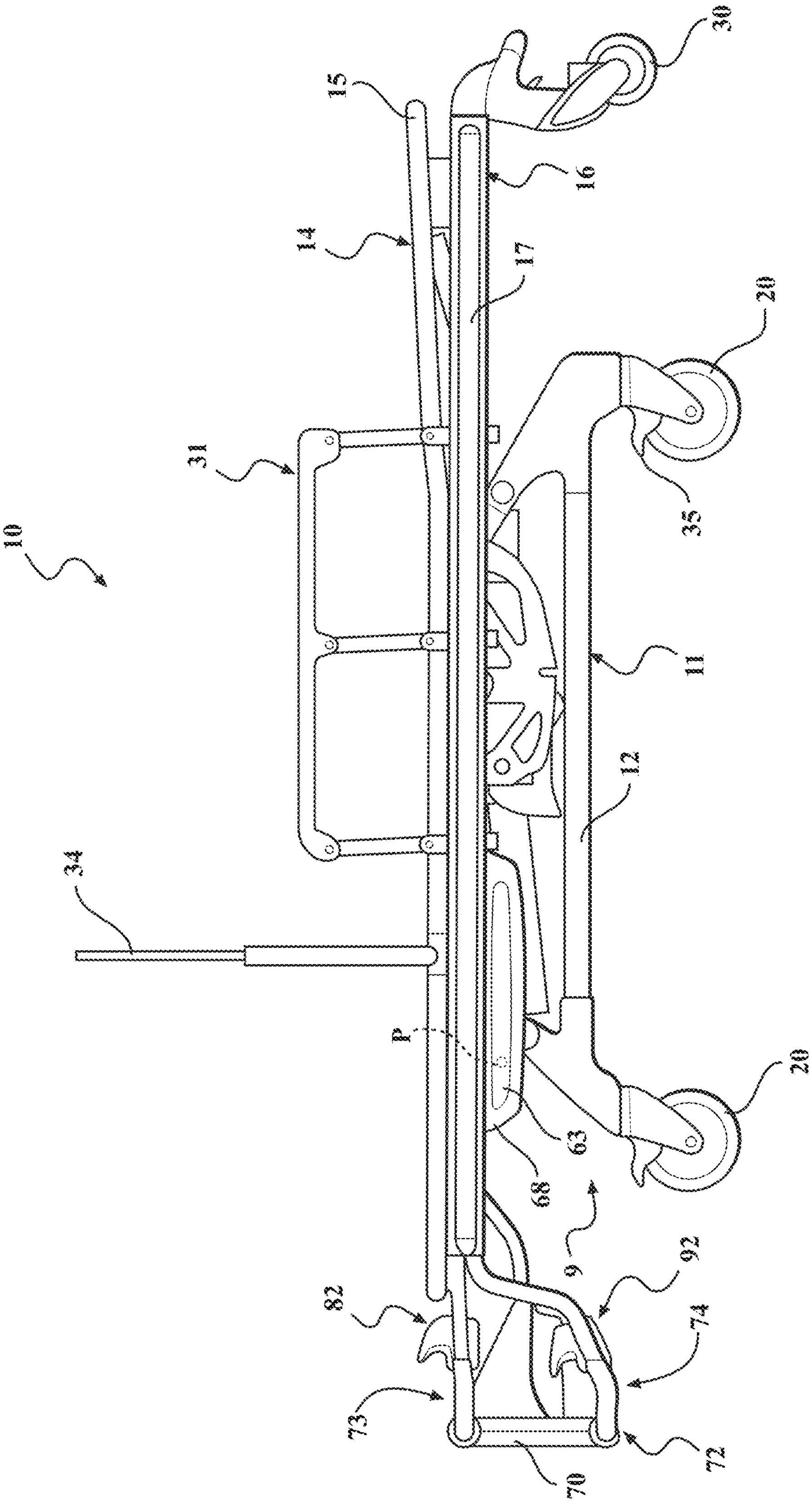
FIG. 3B is a side view of the patient transport apparatus of FIG. 1 in a lowered position.

Referring to FIGS. 1-3B, a patient transport apparatus 10 is shown for supporting a patient in a health care and/or transportation setting. The patient transport apparatus 10 illustrated in FIGS. 1-3B comprises a cot. In other embodiments, however, the patient transport apparatus 10 may comprise a hospital bed, stretcher, table, wheelchair, chair, or similar apparatus utilized in the transportation and care of a patient.

The patient transport apparatus 10 comprises a support structure 9 to provide support for the patient. The support structure 9 comprises a base frame 11. The base frame 11 may comprise longitudinally extending side rails 12 and crosswise extending rails 13 interconnected at the ends thereof to the side rails 12 to form a rectangle. A plurality of caster wheel assemblies 20 are operatively connected proximate each corner of the rectangular shaped base frame 11 formed by the rails 12 and 13. The wheel assemblies 20 may be configured to swivel to facilitate turning of the patient transport apparatus 10. The wheel assembly 20 may comprise a swivel locking mechanism to prevent the wheel assembly 20 from swiveling when engaged. The wheel assembly 20 may also comprise a wheel brake 35 to prevent rotation of the wheel.

The support structure 9 further comprises a litter 16 comprising a litter frame 17. The litter 16 comprises a patient support deck having a patient support surface 14 configured to support a patient. The litter frame 17 may comprise hollow side rails 66 that extend longitudinally along the patient support surface 14. The patient support surface 14 may be comprised of one or more articulable sections, for example, a back section 15 and a foot section 25, to facilitate care and/or transportation of the patient. The litter 16 may further comprise loading wheels 30 extending from the litter frame 17 proximate the back section 15 to facilitate loading and unloading of the patient transport apparatus 10 from a vehicle. For example, the loading wheels 30 may be positioned and configured to facilitate loading and unloading the patient transport apparatus 10 into an ambulance.

Hand rails 31 may extend from opposing sides of the litter frame 17 to provide egress barriers for the patient on the patient support surface 14. The hand rails 31 may also be utilized by an individual, such as an emergency medical technician (EMT) or other medical professional, to move or manipulate the patient transport apparatus 10. The hand rails 31 may comprise a hinge, pivot or similar mechanism to allow the rails 31 to be folded or stored at or below the plane of the patient support surface 14. A vertical support member 34 (see FIG. 3A) may also be attached to the litter frame 17. The vertical support member 34 may be configured to hold a medical device or medication delivery system, such as a bag of fluid to be administered via an IV. The vertical support member 34 may also be configured for the operator of the patient transport apparatus 10 to push or pull on the vertical support member 34 to manipulate or move the patient transport apparatus 10.

A lift mechanism 18 may be configured to interconnect the base frame 11 and the litter 16 to facilitate raising and lowering of the litter 16 relative to a transport surface (e.g., a floor surface). The lift mechanism 18 may be manipulated to adjust the height of the litter 16 to a maximum height (see, e.g., FIG. 3A), a minimum height (see, e.g., FIG. 3B), or any intermediate height in between the maximum and minimum heights, including a defined transport height as described further below.

The lift mechanism 18 may comprise a pair of side-by-side oriented "X" frames 19 and 21. The X frame 19 comprises a pair of X frame members 22 and 23 interconnected together proximate their midpoints by means of a pivot axle 24. Each of the X frame members 22 and 23 is hollow and telescopingly receives therein a further X frame member 26 and an X frame member 27, respectively. The further X frame members 26 and 27 are supported for movement into and out of the respective X frame members 22 and 23. The distal end of the further X frame member 26 is secured via a connection 28 to the cross rail 13 at the left end (foot end) of the base frame illustrated in FIG. 1 whereas the distal end of the further X frame member 27 is connected via a connection 29 to the cross rail 13 at the right end (head end) of the base frame 11.

The X frame 21 is similarly constructed and comprises a pair of X frame members 32 and 33 which are interconnect proximate their midpoints by the aforesaid axle 24. While the axle 24 is illustrated to extend laterally between the X frames 19 and 21, it is to be understood that separate axles 24 can, if desired, be employed. The X frame members 32 and 33 are hollow and telescopingly receive therein a further X frame member 36 telescopingly received in the X frame member 32 whereas a further X frame member 37 is telescopingly received in the X frame member 33. The distal end of the further X frame member 36 is connected via a connector 38 to the cross rail 13 at the foot end of the base frame 11 and the distal end of the further X frame member 37 is connected via a connector 39 to the cross rail 13 at the head end of the base frame 11. The X frame members 22, 26 extend parallel to the X frame members 32, 36 whereas the X frame members 23, 27 extend parallel to the X frame members 33, 37. While the patient transport apparatus 10 illustrated throughout the drawings comprises a support structure 9 with an X frame 19, 21, it is also contemplated that a patient transport apparatus 10 may comprise a support structure 9 and base frame 11 with a pair of front and rear folding leg members.

The proximal ends P of the opposing X frame members 23 and 33 are slidably engaged with brackets 68 (only one shown) attached to the underside of the side rails 66 of the litter frame 17. Each bracket 68 comprises a slot or track 63 configured to allow the proximal end P of the opposing X frame members 23 and 33 to travel along the track 63 as the lift mechanism 18 is manipulated to raise and or lower the litter 16. The configuration or shape of the track 63 may be configured to orient the litter 16 at a particular angle as the lift mechanism 18 is raised and/or lowered. For example, the track 63 may be configured to be straight, or it may comprise one or more bends or curves, creating an S-like shape. The shape of track 63 may be configured to keep the litter 16 approximately level as the litter 16 is raised or lowered between the maximum and minimum heights. The track 63 may also be configured to tilt or angle the patient support surface 14 of the litter 16 so that either the head or leg end of the litter 16 is elevated relative to the opposing end of the litter 16 at various heights. For example, the track 63 may be configured to elevate the head end of the patient support surface 14 when raised to the maximum height to assist in loading and unloading the patient transport apparatus 10 in a vehicle. An outer surface of the bracket 68 may comprise markings, such as a ruler, configured to display the height of the litter 16 in the present position. For example, as the height of the litter 16 is adjusted by the operator and the proximal ends P of the frame members 23, 33, slide along the tracks, a pin may move along the ruler to indicate the height of the litter 16.

Figure 4:
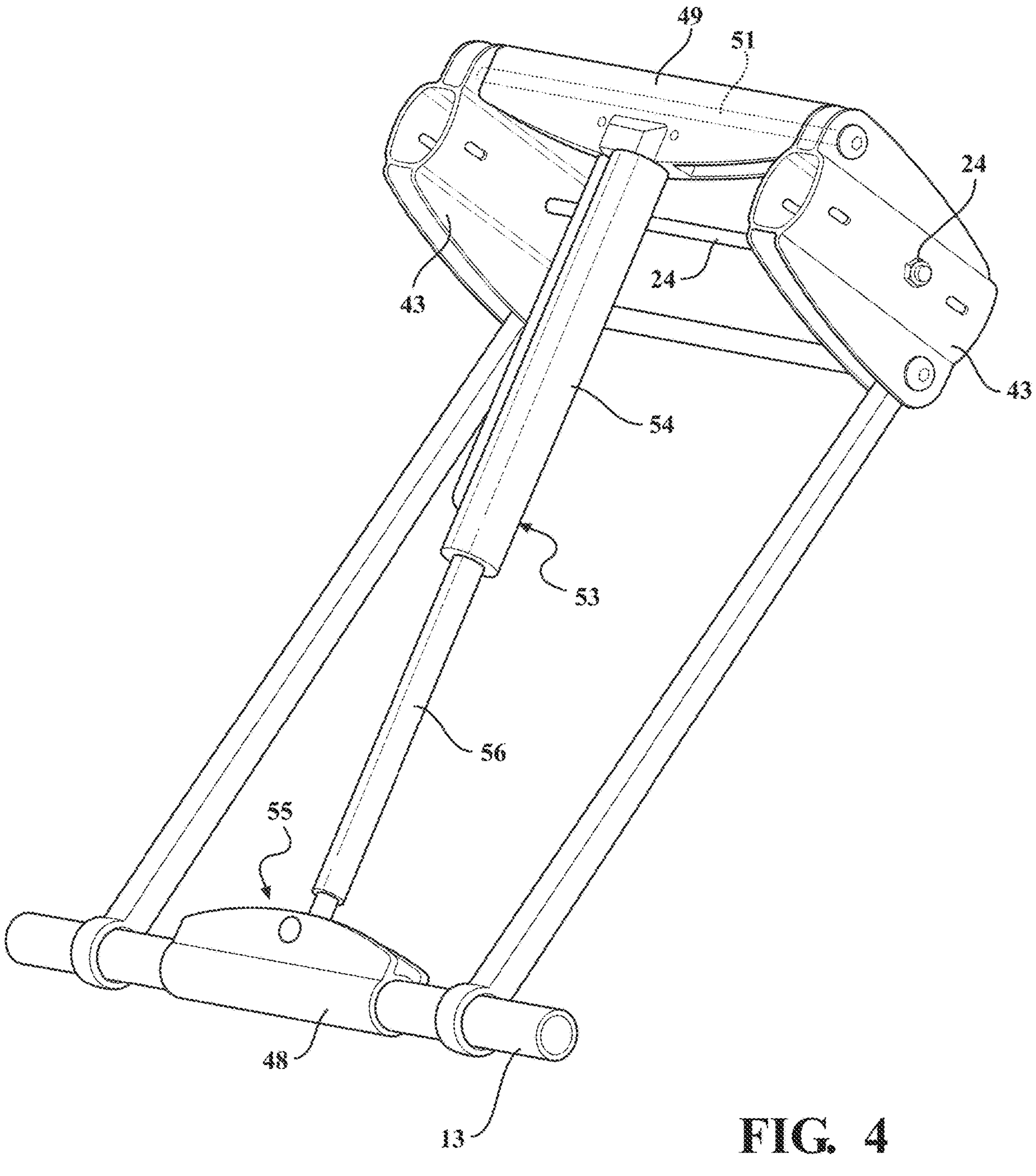
FIG. 4 is a perspective view of an example embodiment of a lift mechanism for the patient transport apparatus of FIG. 1.

The lift mechanism 18 may further comprise an actuator system comprising one or more actuators 53, as illustrated in FIGS. 1 and 4, configured to manipulate the pair of X frames 19, 21 to raise and lower the litter 16. A first bracket 48 (FIG. 4) is fixedly secured to the cross rail 13. A second bracket 49 is secured to a rod 51 that is connected to and extends between the respective brackets 43. In this particular embodiment, the rod 51 is connected to each bracket 43 by a respective fastener.

As illustrated in FIG. 4, a linear actuator 53 (additional actuators may be included if desired to provide improved stability) is connected to and extends between the respective brackets 48 and 49. In this particular embodiment, the linear actuator 53 comprises a hydraulic cylinder housing 54 fastened to the bracket 49, which cylinder housing 54 comprises a reciprocal rod 56 having a piston (not illustrated) at one end thereof located within the cylinder housing 54. The distal end of the reciprocal rod 56 is connected in a conventional manner by a universal-like joint 55 to the bracket 48. That is, the universal joint allows pivotal movement about two orthogonally related axes. Extension and retraction of the reciprocal rod 56 will facilitate movement of the brackets 43 about the axis of the rod 46. The Applicant has described a patient transport apparatus that comprises such a lift mechanism and linear actuators in U.S. Pat. No. 7,398,571, filed on Jun. 30, 2005, entitled, "Ambulance Cot and Hydraulic Elevating Mechanism Therefor," the disclosure of which is hereby incorporated by reference.

Figure 5:
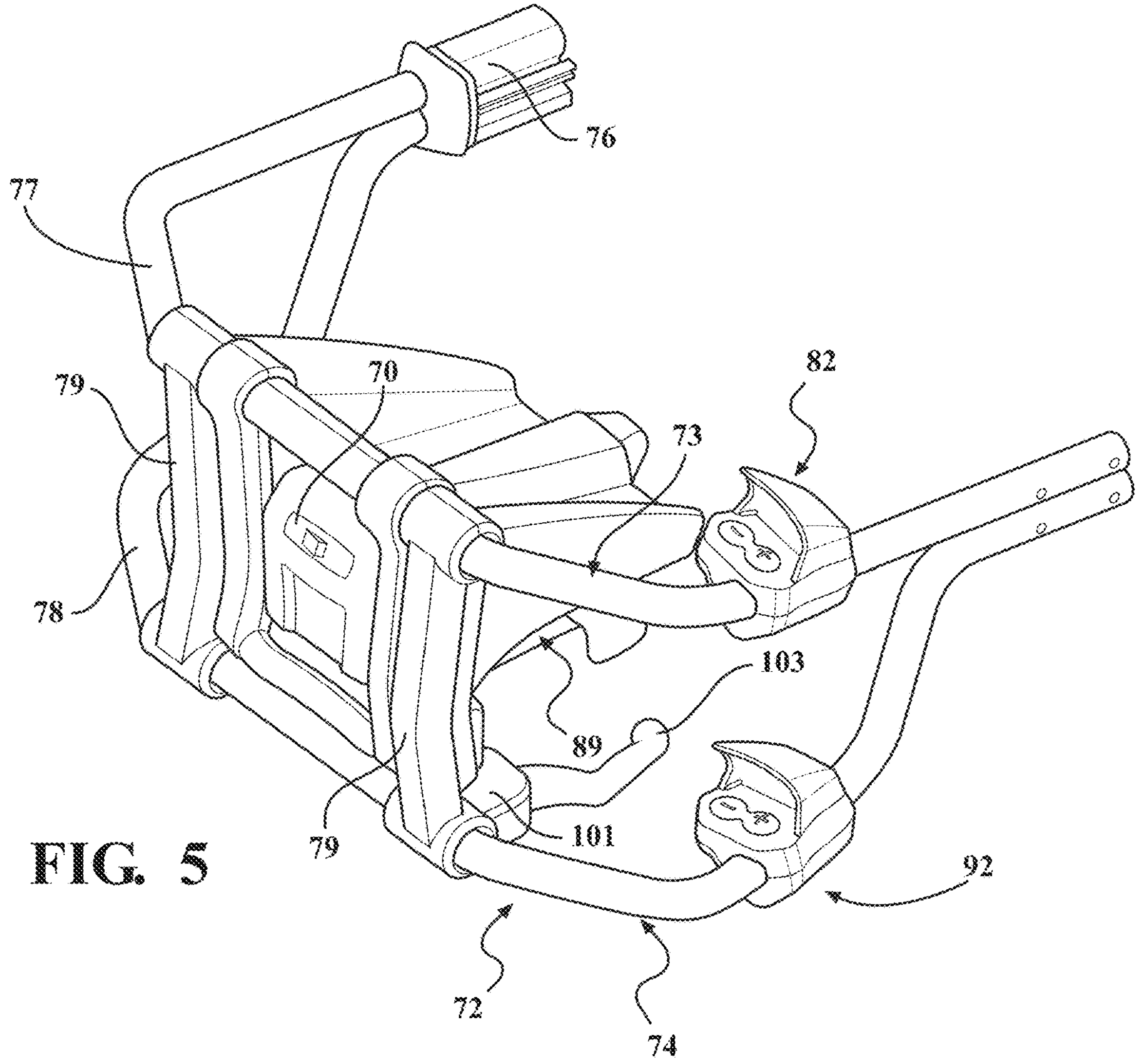
FIG. 5 is a perspective view of an example embodiment of a controller mounted to the patient transport apparatus.

A foot end lift handle mechanism 72 is illustrated in FIG. 5 and comprises a pair of vertically spaced U shaped frame members 73 and 74. The legs of each of the U shaped frame members 73 and 74 are joined together by a bracket 76 (only one bracket being illustrated in FIG. 5). Each bracket 76 is telescopingly affixed inside of the leg end of the respective side rails 66 as illustrated in FIG. 1. Further, the legs of the lower frame member 74 diverge away from the legs of the upper frame member 73 so that there is provided pairs of vertically spaced hand grip areas 77 and 78 on the respective frame members 73 and 74, respectively. Spacer brackets 79 may be connected to opposing portions of each of the frame members 73 and 74 to maintain the vertical spacing between the grip areas 77 and 78. A fastener or pin (not illustrated) may be utilized to facilitate a connection of the brackets 76 to the interior of each of the respective side rails 66.

Figure 6:
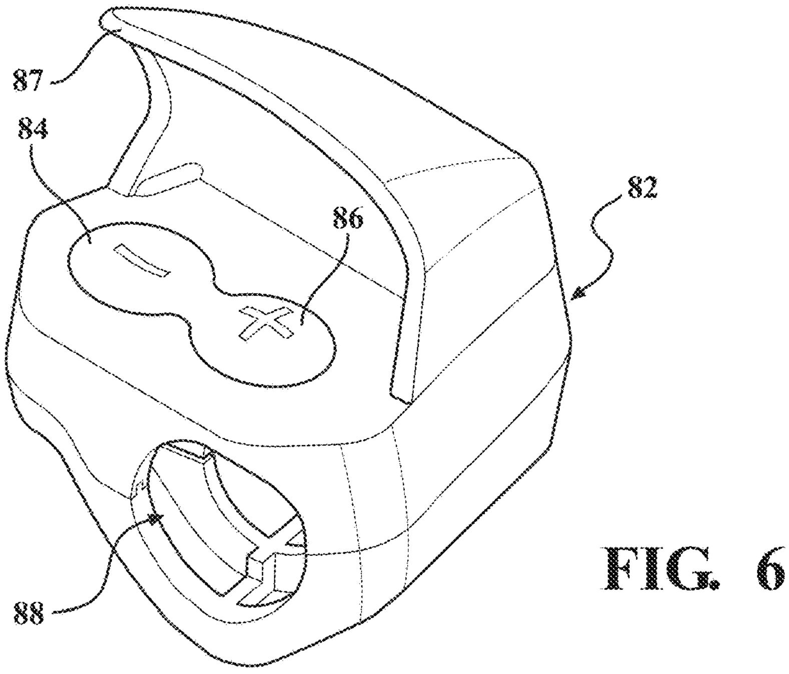
FIG. 6 is a perspective view of an example embodiment of a user input for the controller of FIG. 5.

A first user input or switch housing 82 may be fastened to the frame member 73 (FIG. 5). The first switch housing 82 is located in an ergonomically advantageous position to the obvious grasping point of the user. An enlarged isometric view of the first switch housing 82 is illustrated in FIG. 6. The switch housing has a pair of manually engageable buttons 84 and 86 thereon. The manually engageable buttons 84 and 86 are shielded from above by a shroud 87 and are of a low profile casing design to prevent inadvertent actuation of the buttons 84 and 86 by a patient lying on the patient support surface 14 of the litter 16. That is, the shroud 87 is oriented at the head end of the first switch housing 82. The first switch housing 82 comprises an opening 88 extending therethrough and through which the frame member 73 extends. A fastener may be utilized to facilitate a connection of the first switch housing 82 to the frame member 73 extending through the opening 88.

Similarly, the frame member 74 may comprise a second user input or switch housing 92, located in an ergonomically advantageous position to the obvious grasping point for the user, having an opening extending therethrough and through which the frame member 74 extends. A fastener may be utilized to facilitate connection of the second switch housing 92 to the frame member 74 that extends through the opening in the second switch housing 92. The second switch housing 92 may comprise a construction identical to the first switch housing 82 illustrated in FIG. 6 and it comprises one or more manually engageable buttons which allow the user to manipulate the patient transport apparatus 10. The second switch housing 92 may comprise a shroud similar to the shroud 87 of the first switch housing 82 and it is provided for the same purpose, namely, to shield the buttons 84, 86 from inadvertent actuation. In addition to the safety shrouds preventing inadvertent actuation of the push buttons 84 and 86, each of the push button switches 84, 86 may further comprise a dual switch closing feature requiring both switch contacts to be closed in order to effect the desired operation as will be explained in more detail below. For example, in addition to the top push buttons 84, 86 the switch housing 82, 92 may also comprise a trigger or button on the underside of the housing that must be pressed while pressing the push buttons 84, 86 to articulate the patient transport apparatus 10.

Figure 7:
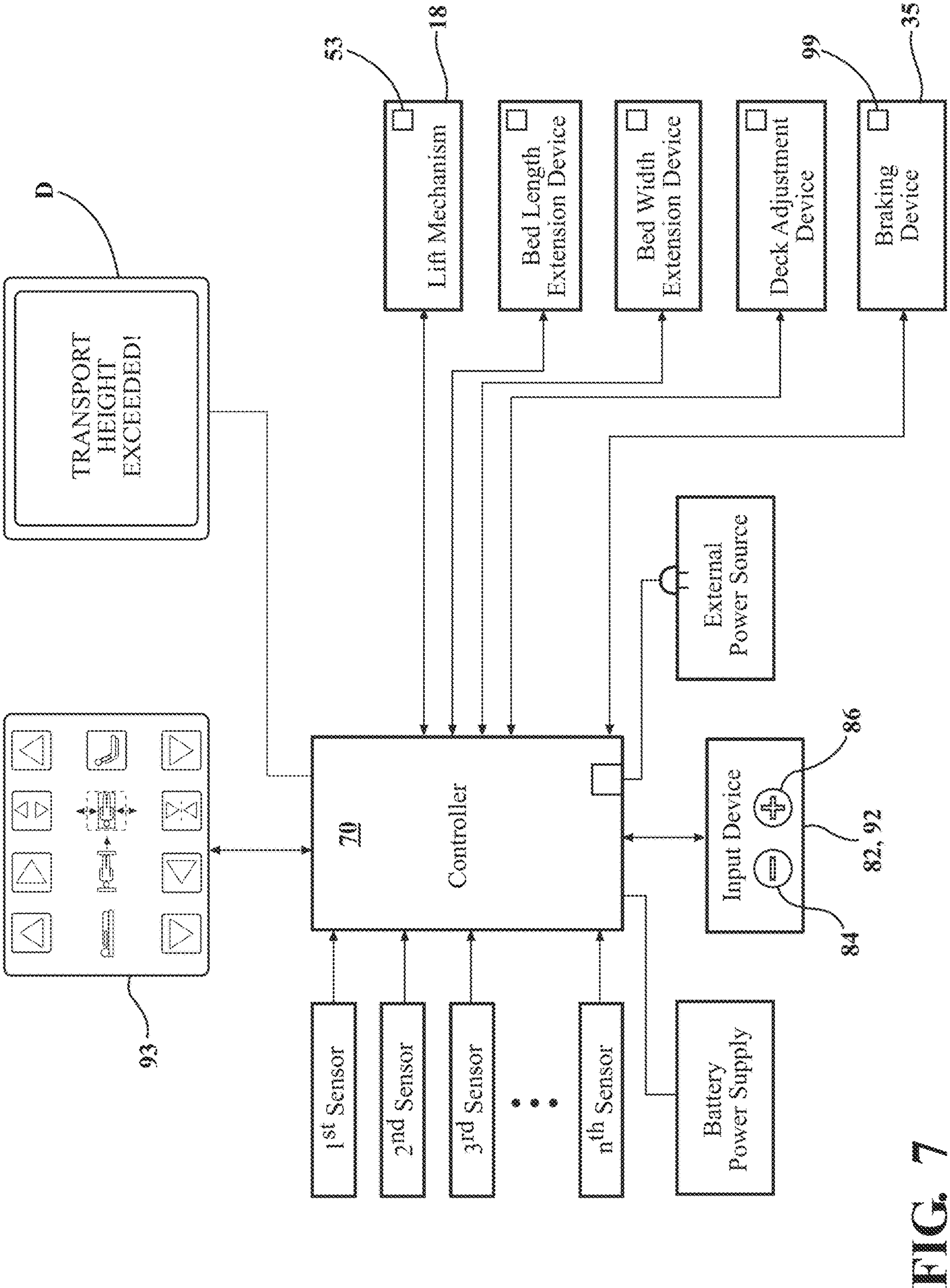
FIG. 7 is a schematic diagram of an example embodiment of the controller of FIG. 5.

Referring to FIG. 7, the patient transport apparatus 10 comprises a controller 70 coupled to the lift mechanism 18 and the user input 82, 92. The controller 70 may comprise memory configured to store data, information, and/or programs. The controller 70 is also coupled to and configured to actuate the actuator 53 of the lift mechanism 18 to raise and lower the litter 16 relative to the transport surface. As described above, the user input 82, 92 comprises buttons 84, 86 that may be configured to send a signal or instructions to the controller 70 to manipulate the lift mechanism 18. For example, the user input may comprise a plus (+) button 86 and a minus (−) button 84, wherein the controller 70 will receive a signal to raise the litter 16 when the operator presses the plus (+) button 86 or a signal to lower the litter 16 when the operator presses the minus (−) button 84. The user input 82, 92 may also comprise additional buttons configured to manipulate the litter 16 and/or patient support surface 14. In some embodiments, a second user input device 93 may be coupled to the controller 70 (either by wire or wirelessly) to control other powered devices of the patient transport apparatus 10. For example, the second user input device 93 may comprise a touchscreen with buttons (virtual) configured to raise and lower the sections 15, 25 of the patient support surface 14, tilt the patient support surface 14, increase and decrease the width of the patient support surface 14, and/or increase and decrease the length of the patient support surface 14.

The controller 70 has one or more microprocessors, microcontrollers, field programmable gate arrays, systems on a chip, discrete circuitry, and/or other suitable hardware, software, or firmware that is capable of carrying out the functions described herein. The controller 70 may be carried on-board the patient transport apparatus 10 (as shown), or may be remotely located. Power to the actuator 53 and/or the controller 70 may be provided by a battery power supply and/or an external power source. The controller 70 is coupled to the actuator 53 in a manner that allows the controller 70 to control the actuator 53. The controller 70 may communicate with the actuator 53 via wired or wireless connections to perform one of more desired functions.

The patient transport apparatus 10 may further comprise one or more sensors coupled to the controller 70. The sensors may be optical sensors, ultrasonic sensors, laser sensors, proximity sensors, pressure sensors, load cells, and/or other suitable sensors for carrying out the functions described herein. The sensors may be configured to detect a plurality of characteristics related to the configuration or position of the patient transport apparatus 10, and/or related to the patient being supported and/or transported on the patient transport apparatus 10, and to communicate with the controller 70. The sensors and the controller 70 may be configured to determine information used to generate control commands (output signals) to manipulate the patient transport apparatus 10 based on a predefined set of rules and/or algorithms for interpreting signals from the sensors. The information may be stored in the controller 70 memory. Example embodiments of how the types of information determined based on sensor input and controller processing and how the patient transport apparatus 10 may be manipulated will be described in greater detail below.

One or more of the sensors may be coupled to the litter 16, base 11, actuator 53, or any other suitable location on the patient transport apparatus 10 to measure the height of the litter 16 relative to the transport surface. For example, a laser sensor or optical sensor may be attached to the underside of the litter 16 and configured to detect/measure the distance between the litter 16 and the transport surface. The distance measured by the sensor may be communicated to the controller 70 and/or determined by the controller 70. Alternatively, the height of the patient support surface 14 may be determined by a Hall effect sensor that is coupled to the actuator 53, wherein the sensor measures how far the actuator 53 has been moved (e.g. the push rod 56 of the linear actuator 53). The controller 70 may be configured to indirectly determine the height of the patient support surface 14 based on the displacement of the actuator 53 measured by the Hall effect sensor. In some embodiments, one or more sensors may be placed in the track 63 to detect a position of one or more of the proximal ends P (e.g., sliders) of the frame members 23, 33 sliding along the tracks 63 wherein the controller 70 is configured to indirectly determine the height of the patient support surface 14 based on a predefined relationship of height to the positions of the proximal ends P in the tracks 63. The sensors could be linear potentiometers, Hall effect sensors, ultrasonic sensors, and the like. One example of an arrangement of Hall effect sensors in the track is described in U.S. Pat. No. 7,398,571, filed on Jun. 30, 2005, entitled, "Ambulance Cot and Hydraulic Elevating Mechanism Therefor," the disclosure of which is hereby incorporated by reference. In some versions, two, three, four, five, or more Hall effect sensors could be placed in the track to indicate discrete positions of the slider in the track, which is tied to discrete height settings, e.g., low, mid1, mid2, mid3, mid 4, mid5 . . . high, etc. In this case, the user/controller 70 may be able to set a desired transport height (e.g., mid1, mid2 . . . etc.), as described further below, with the controller 70 being able to control the actuator 53 to operate until the slider is detected in the appropriate position associated with the desired/selected transport height (e.g., one of the discrete positions). The controller 70 may further be able to automatically indicate the appropriate transport height (e.g., mid1, mid2 . . . etc.)

based on patient weight as described below. It should be appreciated that any reference to a detected/measured height could be based on a vertical distance from a reference point or surface on the litter 16 to the transport surface, an indirect relationship between positions of the sliders in the tracks and a vertical distance from a reference point or surface on the litter 16 to the transport surface as determined during manufacturing, a distance between a reference point or surface on the litter 16 and a reference point or surface on the base 11, or could be relative heights (e.g., high, mid1, mid2, mid3, mid4 . . . , low, etc.), wherein a reference point or surface on the litter 16 is closest to the transport surface at the low height, furthest away at the high height, and at varying heights in between at mid1, mid2, mid3, etc.

The sensors may also comprise a pressure sensor or group of pressure sensors coupled to the patient support surface 14 and configured to detect the presence of and/or measure the mass of an object that is supported by the patient support surface 14. The object may comprise the patient. For example, the pressure sensor may detect that a patient has been placed on the patient support surface 14. The pressure sensors may also be configured to measure a pressure gradient or mass distribution along the length of the patient support surface 14. The controller 70 may be configured to utilize the pressure gradient or mass distribution measured by the pressure sensors to determine a center of gravity for the object or patient on the patient support surface 14. Similarly, the sensors may comprise a load cell or group of load cells attached proximate the litter 16 and coupled to the controller 70, wherein the load cell(s) may be utilized to measure the mass of the patient and/or other object placed on the patient support surface 14.

In an example embodiment, the patient transport apparatus 10 may comprise at least two sensors, wherein a first sensor is configured to measure the height of the patient support surface 14, and a second sensor is configured to measure the mass of the object (e.g., patient) on the patient support surface 14. The controller 70 may be configured to calculate and/or define the transport height for the litter 16 relative to the transport surface based on the height and mass measured by the first and second sensors. The controller 70 may utilize the mass of the patient on the patient support surface 14 and height of the patient support surface 14 to calculate a value associated with a center of gravity for the patient transport apparatus 10.

The patient transport apparatus 10 may have a first or default transport height stored in the memory of the controller 70, and the controller 70 may be configured to define a second transport height based on the mass of the object (or objects). In some cases the default transport height is set based on maximum weight capacity (largest expected mass) of the patient transport apparatus 10, such that the second transport height should usually be greater than the initial default transport height. The second transport height may be calculated based on keeping the value associated with the center of gravity of the patient transport apparatus 10 below a threshold, based on a look-up table that associates measured mass with defined transport height, and/or based on some other algorithm associating mass with height. The relationship of the second transport height to the mass of the object(s) on the patient support surface 14 may be based on a percentage or probability that the patient transport apparatus 10 may tip over at given heights based on the mass of the object being transported. In some cases, the operator may be able to select and store a default percentage or probability to be utilized by the controller 70 when defining the second transport height.

The operator may also be able to manually select the second transport height in response to a prompt on a display coupled to the controller 70. In this case, the controller 70 may calculate an appropriate second transport height based on the mass and then prompt the operator to accept the second transport height. If selected, the second transport height would be set as the new default transport height. The controller 70 could be configured so that the second transport height (e.g., the new default transport height) defaults back to the original default transport height once the controller 70 detects that the object has been removed from the patient transport apparatus 10, such as by sensing a removal of 50% or more of the mass from the patient transport apparatus 10.

The controller 70 may be configured to automatically adjust the patient support surface 14 to the second transport height upon receiving an input from the operator. For example, when the patient support surface 14 is at its lowest position and a patient is placed onto the patient support surface 14, when the operator presses the button 86, the patient support surface 14 may be automatically raised to the second transport height. Similarly, if the patient support surface 14 is above the second transport height and a patient is placed on the patient support surface 14, the patient support surface 14 may be automatically lowered to the second transport height, when the operator presses the button 84. In some embodiments, when there is no object on the patient support surface 14, or the total mass on the patient support surface 14 is less than a threshold value (indicating there is no patient present), then the transport height limitations/indications may be removed/deactivated by the controller 70 such that the operator can freely raise and lower the litter 16 from its minimum height to its maximum height, without any pause and/or indications of the transport height. This can reduce the annoyance to the operator that might otherwise occur when limiting the operator's ability to raise the litter 16 when the litter is empty, for instance.

In some versions, the operator may be required to hold the button 86 or the button 84 to raise or lower the patient support surface 14, in which case, the controller 70 may stop or pause operation of the actuator 53 or otherwise indicate that the second transport height has been reached. For example, as the patient support surface 14 is raised, the controller 70 may be configured to pause the actuator 53 to notify the operator that the second transport height has been reached. This pause could be for 1 second, 2 seconds, or more, and operation of the actuator 53 could continue to move the patient support surface 14 higher after the pause, i.e., the operator could override the second transport height in some embodiments.

In some embodiments, certain operators may be restricted from overriding the second transport height, while other operators may have access to override the second transport height. This selected access could be based on identification devices (e.g., RFID badges, badges with NFC devices, bar codes, and the like) worn or carried by the operators that communicate with the controller 70 (e.g., via a RFID reader connected to the controller 70) to identify the operators to the controller 70. This could be based on a lookup table of operator IDs associated with the identification devices and associated with permission levels. This could also be controlled by username and/or password. If the controller 70 fails to detect an operator with suitable permission level to override the second transport height (or fails to receive a suitable username/password), then the operator may be locked out from raising the patient support surface 14 above the second transport height. If the controller 70, however, detects an operator with a suitable permission level to override the second transport height, then the operator may move the patient support surface 14 higher.

A proximity sensor may also be coupled to the controller 70 and configured to detect the location of the patient transport apparatus 10 relative to a reference location. The reference location may be a vehicle, such as an ambulance, or a building, such as a hospital or medical facility. The controller 70 may be configured to actuate the actuator 53 of the lift mechanism 18 to adjust the height of the patient support surface 14 based on the proximity of the patient transport apparatus 10 relative to the reference location. For example, when the proximity sensor detects that the patient transport apparatus 10 is within a defined distance, such as 50 feet, from the reference location (e.g., from an ambulance), the controller 70 may be configured to automatically raise the litter 16 to a maximum height or loading height in preparation for loading the patient transport apparatus 10 into the ambulance. Alternatively, the controller 70 may enable the operator to raise the litter 16 from the second transport height to the maximum height. The controller 70 may thus be configured to override certain protocols or limits, such as the second transport height restriction, when the patient transport apparatus 10 is within the defined proximity of the reference location. The Applicant has described a patient transport system that comprises a loading mechanism configured to facilitate the loading and unloading of the patient transport apparatus 10 from a vehicle in U.S. Pat. No. 8,439,416, filed on Sep. 21, 2010, entitled, "Ambulance Cot and Loading and Unloading System," the disclosure of which is hereby incorporated by reference.

Suitable proximity of the patient transport apparatus 10 to the reference location could be based on communication between the loading mechanism and the patient transport apparatus 10 being established, e.g., using a short-range communication protocol, such as a near field magnetic induction communication (NFMIC) protocol, a radio frequency identification (RFID) protocol, a Bluetooth protocol, etc. The proximity sensor may comprise a first component (e.g., a transmitter coil, an RFID reader, a transceiver, or the like) on the patient transport apparatus 10 that is configured to communicate with a second component (e.g., a receiver coil, an RFID tag, a transceiver, or the like), which is at the reference location (e.g., on the loading mechanism). The first component may be configured to transmit a detection signal. If the second component is within a specified proximity of the first component, as determined by the capabilities of the short-range communication protocol employed, the second component provides a response signal, which the first component is configured to detect.

The patient transport apparatus 10 may comprise a display or other notification device D coupled to the controller 70 to indicate to the operator one or more of: (i) the current height of the patient transport apparatus 10; (ii) the second transport height; (iii) a weight of the object(s) on the patient support surface 14; (iv) when the second transport height has been reached and/or exceeded; (v) and/or other information. The notification device D may be a visual indicator, audible indicator, and/or tactile indicator. For instance, the patient transport apparatus 10 may comprise a visual indicator comprising a plurality of lights wherein the controller 70 is configured to cause the visual indicator to display a first visual indication if the patient support surface 14 is above the second transport height, a second visual indication, different than the first visual indication, if the patient support surface 14 is at the second transport height, and a third visual indication, different than the first and second visual indications if the patient support surface 14 is below the second transport height. For example, the visual indicator may display a red light if the patient support surface 14 is above the second transport height, may display a yellow light when the patient support surface 14 is at the second transport height, and may display a green light when the patient support surface 14 is below the second transport height.

The controller 70 may also be configured to command the visual indicator to display a down arrow (↓) when the patient support surface 14 is above the second transport height to indicate that the patient support surface 14 needs to be lowered, to display a line ( - - - ) when the patient support surface 14 is at the second transport height, and to display an up arrow (↑) when the patient support surface 14 is below the second transport height to indicate that the patient support surface 14 can be raised further. The visual indicator may also be configured to display text or other images to indicate the position of the patient transport apparatus 10 relative to the second transport height.

The patient transport apparatus 10 may comprise a tactile indicator comprising, for example, a piezoelectric device arranged beneath one or both of the buttons 84, 86 and coupled to the controller 70 such that the controller 70 is able to operate the tactile indicator to cause vibration of the buttons when the second transport height has been reached and/or to indicate that the transport height is approaching, e.g., a series of vibrations of increasing intensity. Audible indicators could also be employed in the same manner to indicate that the second transport height has been reached and/or is approaching.

The controller 70 may be configured to actuate the actuator 53 of the lift mechanism 18 to manipulate the height of the litter 16 based on any combination of the characteristics, data, or information provided by the one or more sensors. The controller 70 may automatically adjust the height of the patient support surface 14 once an object or patient is placed on the patient support surface 14 based on the input to the controller 70 provided by the sensors. Alternatively, the controller 70 may be configured to require a user input before automatically adjusting the height of the patient support surface 14 based on the input provided by the sensors to the controller 70. Furthermore, the controller 70 may be configured to only allow for manual adjustment of the patient support surface 14 via user input and to notify the user when the defined transport height has been reached via pausing or other audible, visual, and/or tactile indications.

In some embodiments, the controller 70 may be coupled to and configured to engage the swivel lock and/or the wheel brake 35 when the patient support surface 14 height exceeds the second transport height. For example, if the patient is placed on the patient support surface 14 and the height exceeds the second transport height, the controller 70 may engage the wheel brake 35 to prevent the operator from moving the patient transport apparatus 10. Similarly, the controller 70 may engage the swivel lock mechanism to prevent the wheel assembly 20 from swiveling. In other versions, the controller 70 may be configured to unlock the wheel brake 35 and/or swivel lock once the second transport height has been reached. An electric actuator 99 (or other suitable type of actuator) may be coupled to the wheel brake 35 and the controller 70 to enable actuation of the wheel brake 35 in response to reaching or exceeding the second transport height. An example of electric brakes that could be employed on the patient transport apparatus 10 for this purpose is shown in U.S. Pat. No. 7,690,059, filed Dec. 18, 2006, entitled "Hospital Bed," which is hereby incorporated by reference herein.

While the controller 70 may be configured to prevent the patient support surface 14 from exceeding a defined transport height, it is contemplated that the user input 82, 92 may comprise a button or buttons that allow the operator of the patient transport apparatus 10 to override and/or exceed the defined transport height. The controller 70 may be configured to log the time, date, and duration of time that the patient transport apparatus 10 is operated while exceeding the defined transport height and store the data in the controller 70 memory for future evaluation. For example, the log may be utilized to evaluate the performance of one or more operators of the patient transport apparatus 10 (e.g., via their identification devices). The log may also be utilized to update the probability that a tip will occur at a given transport height, and the data in the log may be utilized to improve accuracy for defining a safe transport height in future uses.

It will be further appreciated that the terms "include," "includes," and "including" have the same meaning as the terms "comprise," "comprises," and "comprising." Moreover, it will be appreciated that terms such as "first," "second," "third," and the like are used herein to differentiate certain structural features and components for the non-limiting, illustrative purposes of clarity and consistency.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient transport apparatus comprising:

a support structure comprising a base frame, and a litter with a patient support surface to support a patient;

a lift mechanism comprising an actuator system to facilitate movement of the patient support surface to different heights relative to the base frame;

one or more sensors responsive to changes in the height of the patient support surface relative to the base frame resulting from operation of the lift mechanism;

a user input device to receive input from a user;

a proximity sensor configured to detect a location of the support structure relative to a vehicle; and a controller operably connected to the actuator system, the one or more sensors, the user input device, and the proximity sensor, the controller being configured to:

define a transport height for the patient support surface based on a mass acting on the patient support surface, operate the actuator system to raise or lower the patient support surface to the defined transport height in response to input from the user on the user input device, allow operation of the actuator system to permit raising the patient support surface to a loading height, higher than the defined transport height, in response to the proximity sensor detecting that the support structure is within a predefined proximity of the vehicle.

2. The patient transport apparatus of claim 1, wherein the controller is further configured to determine patient presence on the patient support surface, and define the transport height for the patient support surface based at least in part on the patient presence.

3. The patient transport apparatus of claim 2, including one or more sensors responsive to patient presence on the patient support surface.

4. The patient transport apparatus of claim 3, wherein the one or more sensors responsive to patient presence on the patient support surface are configured to determine the mass acting on the patient support surface.

5. The patient transport apparatus of claim 3, wherein the controller is configured to determine if an object, instead of the patient, is located on the patient support surface based at least in part on data received from the one or more sensors responsive to patient presence on the patient support surface.

6. The patient transport apparatus of claim 5, wherein the controller is configured to define a second transport height for the object based at least in part on the mass of the object on the patient support surface, and to operate the actuator system to raise or lower the patient support surface to the second defined transport height.

7. The patient transport apparatus of claim 2, wherein the controller is configured to limit operation of the actuator system to prevent raising the patient support surface above the defined transport height in response to detecting patient presence when the proximity sensor detects that the support structure is not located within a predefined proximity of the vehicle.

8. The patient transport apparatus of claim 1, wherein the controller is configured to at least pause operation of the actuator system when the patient support surface reaches the defined transport height.

9. The patient transport apparatus of claim 8, wherein the controller, based on the input from the user, is configured to override the paused operation such that the actuator system is operable to raise the patient support surface above the defined transport height.

10. The patient transport apparatus of claim 1, wherein the controller further comprises a memory configured to store a user selected transport height.

11. The patient transport apparatus of claim 10, wherein the controller is configured to modify the user selected transport height based on one or more parameters of the patient.

12. The patient transport apparatus of claim 1, further comprising a loading mechanism configured for placement in a vehicle, the loading mechanism configured to couple to the support structure.

13. The patient transport apparatus of claim 1, wherein the controller is configured to allow the user to raise to patient support surface above the defined transport height with input from the user on the user input device when the proximity sensor detects that the support structure is within a predefined proximity to the vehicle.

14. The patient transport apparatus of claim 1, further comprising an indicator operably connected to the controller and comprising one or more of a visual indicator, audible indicator, and tactile indicator.

15. The patient transport apparatus of claim 14, wherein the indicator comprises the visual indicator and the controller is configured to cause the visual indicator to display a first visual indication if the patient support surface is above the defined transport height.

16. The patient transport apparatus of claim 15, wherein the controller is configures to cause the visual indicator to display a second visual indication, different than the first visual indication, if the patient support surface is at the defined transport height.

17. The patient transport apparatus of claim 1, further comprising wheels attached to the support structure opposite the patient support surface, and a brake operably attached to at least one of the wheels.

18. The patient transport apparatus of claim 17, wherein the controller is coupled to the brake and is configured to engage the brake when the patient support surface exceeds the defined transport height.

19. The patient transport apparatus of claim 1, further comprising wheels attached to the support structure and capable of swiveling about swivel axes to facilitate turning of the patient support surface, and a swivel locking mechanism operably attached to at least one of the wheels.

20. The patient transport apparatus of claim 19, wherein the controller is coupled to the swivel locking mechanism and is configured to engage the swivel locking mechanism to prevent rotation of at least one of the wheels when the patient support surface exceeds the defined transport height.

* * * * *